United States Patent
Amm et al.

(10) Patent No.: US 7,218,336 B2
(45) Date of Patent: May 15, 2007

(54) METHODS AND APPARATUS FOR DRIVING ILLUMINATORS IN PRINTING APPLICATIONS

(75) Inventors: David T. Amm, Sunnyvale, CA (US);
Douglas A. Webb, Los Altos, CA (US);
Gregory A. Myatt, Union City, CA (US)

(73) Assignee: Silicon Light Machines Corporation, San Jose, CA (US)

( * ) Notice: Subject to any disclaimer, the term of this patent is extended or adjusted under 35 U.S.C. 154(b) by 0 days.

(21) Appl. No.: 10/943,364

(22) Filed: Sep. 17, 2004

(65) Prior Publication Data

US 2005/0068411 A1 Mar. 31, 2005

Related U.S. Application Data

(60) Provisional application No. 60/506,492, filed on Sep. 26, 2003.

(51) Int. Cl.
*B41J 2/47* (2006.01)

(52) U.S. Cl. ...................... 347/239; 347/255

(58) Field of Classification Search ............... 347/9, 347/234, 236–240, 247–255, 142–145; 358/1.9, 358/3.1, 3.01–3.02, 3.21, 521, 523, 529–530; 382/173
See application file for complete search history.

(56) References Cited

U.S. PATENT DOCUMENTS

| | | | |
|---|---|---|---|
| 5,381,236 A | 1/1995 | Morgan | |
| 5,638,107 A * | 6/1997 | Curry | 347/234 |
| 5,777,736 A | 7/1998 | Horton | |
| 5,920,646 A * | 7/1999 | Kamon | 382/173 |
| 6,034,787 A * | 3/2000 | Hashimoto et al. | 358/1.9 |
| 6,188,426 B1 * | 2/2001 | Nakamura | 347/239 |
| 6,215,579 B1 | 4/2001 | Bloom et al. | |
| 6,229,650 B1 | 5/2001 | Reznichenko et al. | |
| 6,295,078 B1 * | 9/2001 | Kerby et al. | 347/253 |
| 6,342,960 B1 | 1/2002 | McCullough | |
| 6,346,993 B1 * | 2/2002 | Curry | 358/1.9 |
| 6,377,293 B2 | 4/2002 | Koh et al. | |
| 6,390,579 B1 * | 5/2002 | Roylance et al. | 347/9 |
| 6,479,811 B1 | 11/2002 | Kruschwitz et al. | |
| 6,636,339 B2 | 10/2003 | Lee | |
| 6,664,996 B2 * | 12/2003 | Mano | 347/236 |

OTHER PUBLICATIONS

D.T. Amm, et al., "Grating Light Valve Technology: Update and Novel Applications" May 19, 1998, pp. 1-4, Silicon Light Machines. Presented at Society for Information Display Symposium, Anaheim, CA.

(Continued)

*Primary Examiner*—Hai Pham
(74) *Attorney, Agent, or Firm*—Okamoto & Benedicto LLP

(57) ABSTRACT

A method of providing drive signals to an illuminator module having a plurality of channels in a printing application. Binary image data including image bits is provided from a data source to the illuminator module. Each image bit is converted to a multi-bit amplitude value within the illuminator module, wherein the conversion of each image bit to the multi-bit amplitude value depends at least on a value of the image bit and which channel is associated with the image bit. Pulse width modulation (PWM) may be applied to the drive signals using programmable transition delays. Apparatus for performing the aforementioned method are also disclosed.

20 Claims, 10 Drawing Sheets

OTHER PUBLICATIONS

David T. Amm, et al. "Optical Performance of the Grating Light Valve Technology" 1999, pp. 1-8, Silicon LIght Machines, Sunnyvale, California.

R.W. Corrigan, "An Alternative Architecture for High Performance Display" Nov. 20, 1999, pp. 1-5, Silicon Light Machines, Presented at SMPTE Technical Conference and Exhibition, New York, NY.

R.W. Corrigan, et al. "Calibration of a Scanned Linear Grating Light Valve Projection System" May 18, 1999, pp. 1-4, Silicon Light Machines. Presented at Society for Information Display Symposium, San Jose, CA.

D.M. Bloom "The Grating Light Valve; revolutionizing display technology" pp. 1-10, Silicon Light Machines (formerly Echelle, Inc.), Sunnyvale, California.

* cited by examiner

METHODS AND APPARATUS FOR DRIVING ILLUMINATORS IN PRINTING APPLICATIONS

CROSS-REFERENCE TO RELATED APPLICATION(S)

The present invention claims the benefit of U.S. provisional patent application No. 60/506,492, entitled "Methods and Apparatus for Driving Light Modulators for Printing Applications", filed on Sep. 26, 2003 by inventors David T. Amm, Douglas A. Webb, and Gregory A. Myatt. The disclosure of U.S. provisional patent application No. 60/506,492 is hereby incorporated by reference.

BACKGROUND OF THE INVENTION

1. Field of the Invention

The present invention relates generally to illuminators, including light modulators, and more particularly, but not necessarily exclusively, to methods and apparatus for driving illuminators in printing applications.

2. Description of the Background Art

Light modulators fabricated using micro electromechanical system (MEMS) technology, in general, are well known. Examples of such light modulators include the Grating Light Valve™ (GLV™) light modulator available from Silicon Light Machines Corporation of Sunnyvale, Calif. Devices that are of the same type as GLV™ light modulators are hereinafter referred to as "ribbon light modulators". Ribbon light modulators are described in the following disclosures, which are integral to this provisional application and can be found, for example, in U.S. Pat. No. 5,311,360 to Bloom et al.; U.S. Pat. No. 5,841,579 to Bloom et al.; and U.S. Pat. No. 5,661,592 to Bornstein et al. The disclosures of the aforementioned patents are hereby incorporated by reference.

Ribbon light modulators can be employed in various applications including optical networks, video, and printing. As can be appreciated, it is advantageous to optimize a light modulator for a specific application.

Ribbon light modulators have been employed in printing applications. In one printing application, a laser beam is bounced off a reflective surface of a ribbon light modulator and onto a plate. The laser beam has a power density that, when focused, is sufficient to expose the plate. The ribbon light modulator is actuated to modulate the laser beam and form a pattern on the plate. The plate is inked and rolled onto paper to transfer the pattern thereon. The Xcalibur 45™ platesetter from the Agfa Corporation employs such a ribbon light modulator. The use of a ribbon light modulator in a printing application is also disclosed in U.S. Pat. No. 6,229,650.

SUMMARY

One embodiment of the invention relates to a method of providing drive signals to an illuminator module having a plurality of channels in a printing application. Binary image data comprising image bits is provided from a data source to the illuminator module. Each image bit is converted to a multi-bit amplitude value within the illuminator module, wherein the conversion of each image bit to the multi-bit amplitude value depends at least on a value of the image bit and which channel is associated with the image bit. Pulse width modulation (PWM) may be applied to the drive signals using programmable transition delays.

Another embodiment relates to an apparatus for driving an illuminator array having a plurality of channels in a printing application. A driver integrated circuit is configured to receive binary image data, and storage is provided within the driver integrated circuit for at least two multi-bit amplitude values per channel. Selection circuitry for each channel is configured to select one of the multi-bit amplitude values depending at least on a value of an image bit. The driver integrated circuit may be configured to provide a pulse width modulation mode that applies pulse width modulation to the drive signals and that uses an independent PWM clock.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided such as examples of apparatus, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention will be described using ribbon light modulators as examples. It should be understood, however, that the present invention is not so limited, and may be generally employed in other applications involving the use of other types of light modulators in various printing applications. In addition, another embodiment includes direct light emitters such as lasers, VCSELs, and light emitting diodes (LEDs), used in printing applications. Light modulators and light emitters are collectively referred to herein as "illuminators." Furthermore, for purposes of the present disclosure, the term "printing applications" includes paper printing, printing onto plates for a computer-to-plate application (CTP), and lithography applications.

Amplitude Values for Digital Printing

Figure 1:
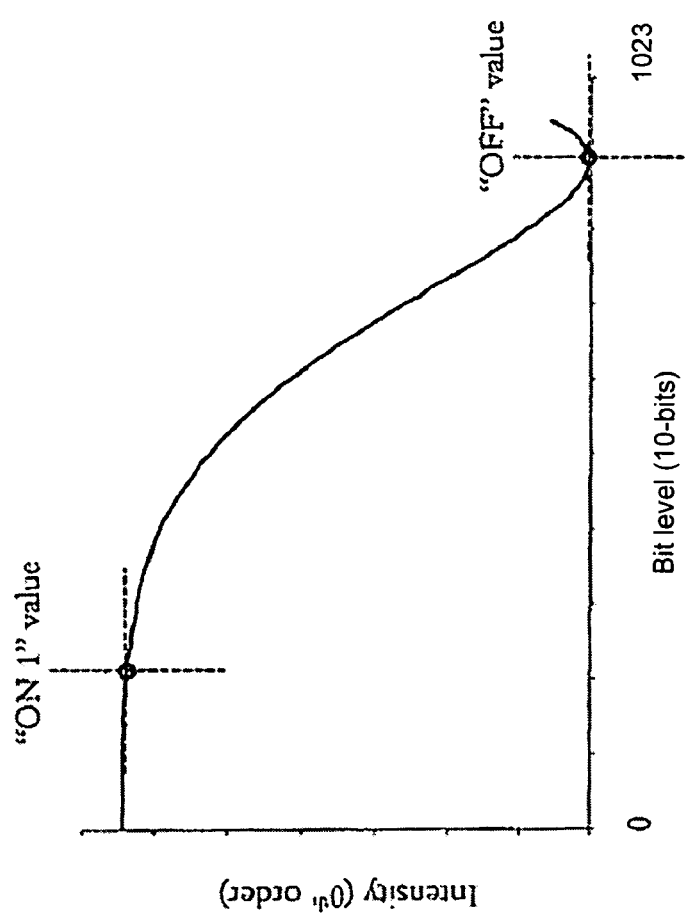
FIG. 1 shows an example output characteristic for a ribbon light modulator pixel, and typical operating points that would be determined through calibration.

For digital printing applications, only two values are required for each ribbon light modulator pixel. In an ideal case, those values for an 10-bit system would be 0 and 1023. However, the printed (output) light intensity may need to be very uniform across the ribbon light modulator array. Compensation for non-uniformities in the optics, electronics and ribbon light modulator array itself, can be obtained through a calibration process, whereby each pixel is assigned a unique 10-bit value for both the ON and OFF states, such that the optical intensity output of each pixel is identical. This is referred to as "amplitude" data for each pixel. FIG. 1 shows the output characteristic for a ribbon light modulator pixel, and typical operating points that would be determined through calibration, are further identified as an example. As shown, the ON or '1' value is at a bit level somewhat greater than the minimum 0 value, and the OFF or '0' value is at a bit level somewhat less than the maximum 1023 value.

The amplitude calibration data then includes two 10-bit values for each of the pixels (or "channels"). It is of interest to note that these values, in general, do not need to be changed until a new calibration is required, which can be anywhere from a few minutes up to days or weeks.

Architecture Needing High Bandwidth from Data Source

Figure 2A:
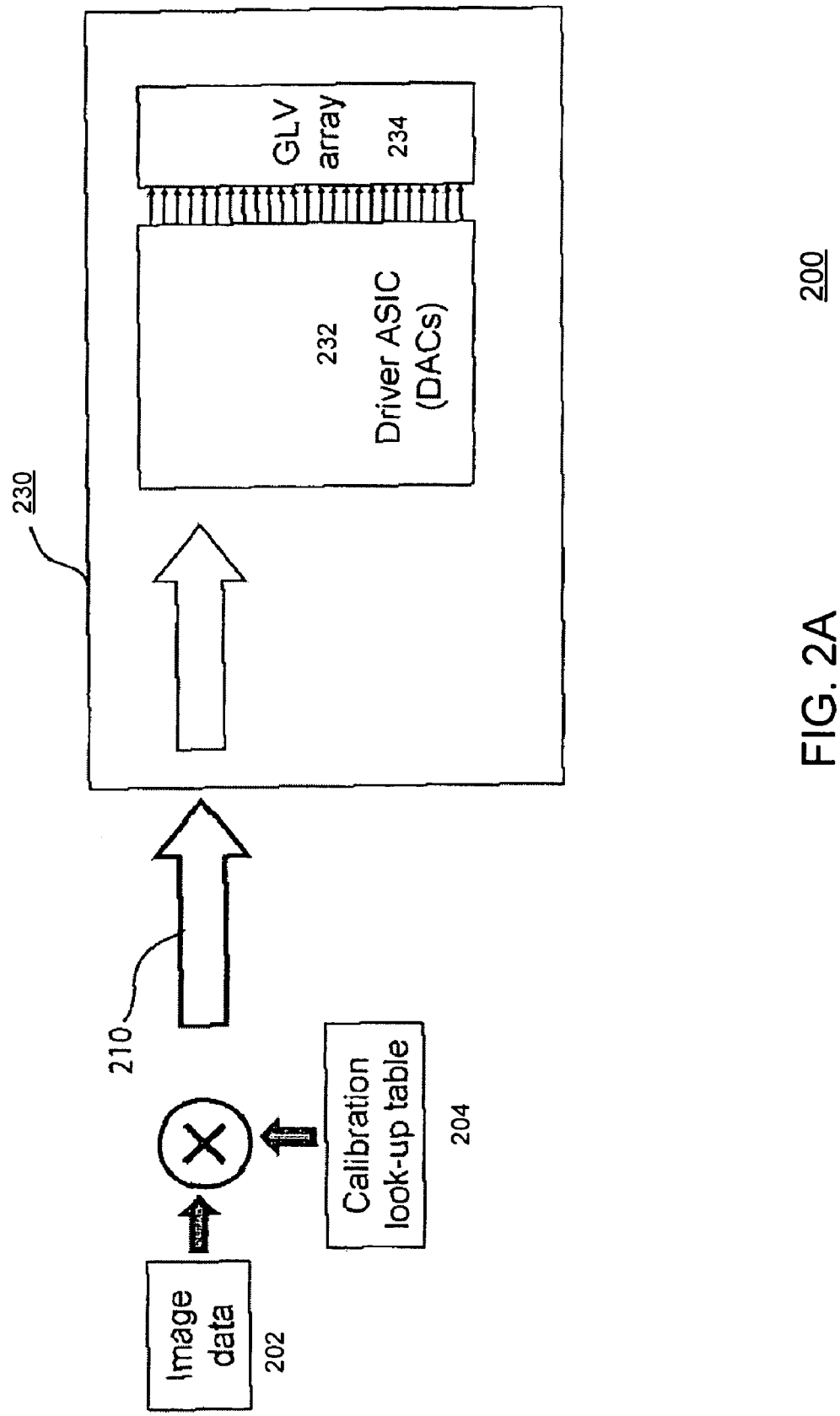
FIG. 2A schematically shows an example architecture for driving an array of light modulators.

FIG. 2A schematically shows an example architecture 200 for driving an array of light modulators 234. A light modulator board or module 230 includes a driver application-specific integrated circuit (ASIC) 232 and the light modulator array 234 being driven. In the example of FIG. 2A, the light modulator array 234 comprises an array of GLV™ light modulators.

In the example of FIG. 2A, calibration 204 is performed "upstream" at the source of the data inputs, which are referred to as "image data" 202. In this architecture 200, the amount of data transmitted 210 to the driver module 230 is increased substantially when the calibration information is provided, thereby complicating processing performed at the driver module 230. For example, the calibration data may comprise 10-bits per image bit, and so may multiple the image data by a factor of 10. In other implementations, the calibration data may comprise other numbers of bits per image bit.

Figure 2B:
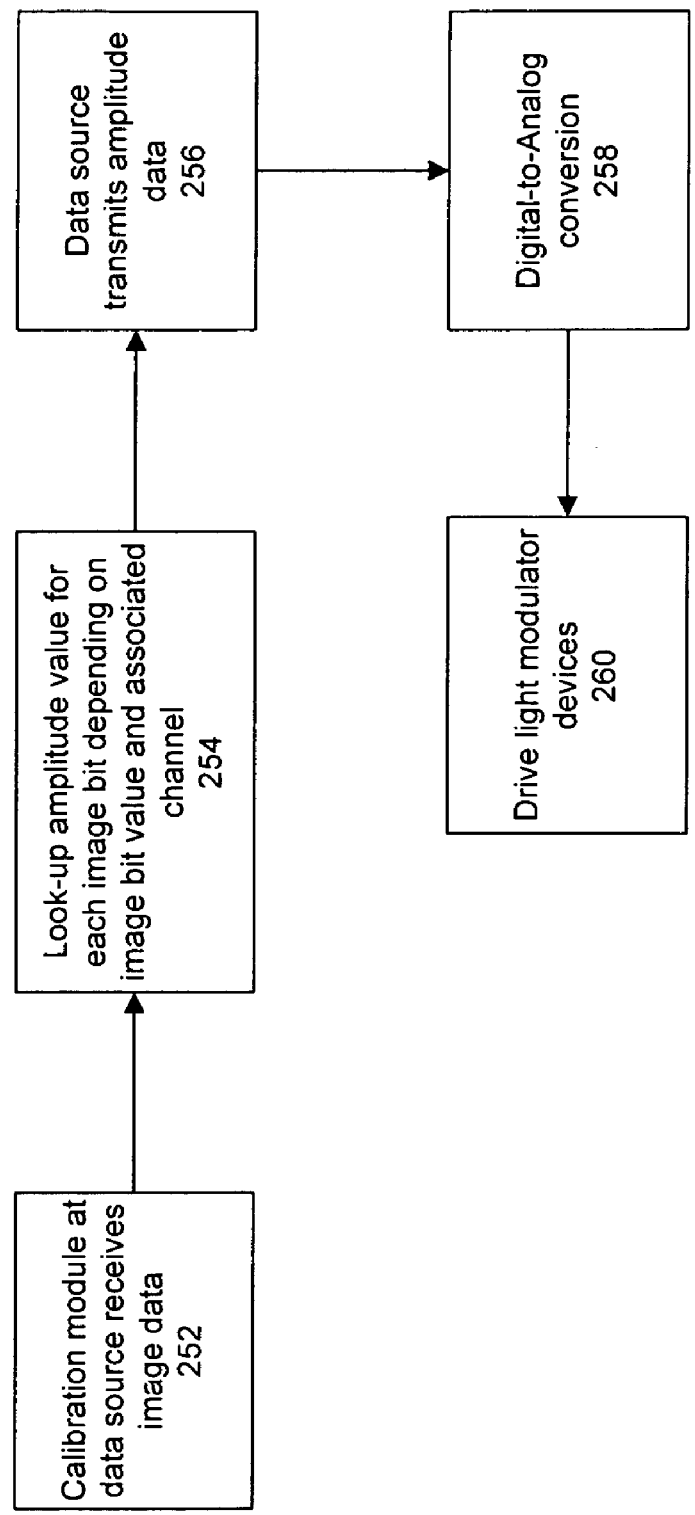
FIG. 2B is a flow chart depicting a method of driving utilizing the architecture shown in FIG. 2A.

FIG. 2B is a flow chart depicting a method 250 of driving utilizing the architecture shown in FIG. 2A. In accordance with this method 250, the image data is received 252 at a calibration module or unit at the data source. This calibration module looks-up 254 an amplitude value for each bit in the image data (in other words, for each image bit). The amplitude value retrieved depends on the value of the image bit and the associated channel (i.e. the associated light modulator device in the array 234).

These amplitude values (one amplitude value per image bit) are transmitted 256 from the data source to the light modulator board or module 230. For example, if the amplitude values are 10-bit values, then 10 bits are transmitted 256 for each image bit. In other implementations, the amplitude values may have other numbers of bits.

At the light modulator module 230, digital to analog conversion of the amplitude values is performed 258. The resulting analog signals are used to drive 260 the light modulator devices.

Architecture Requiring Less Bandwidth from Data Source

Figure 3A:
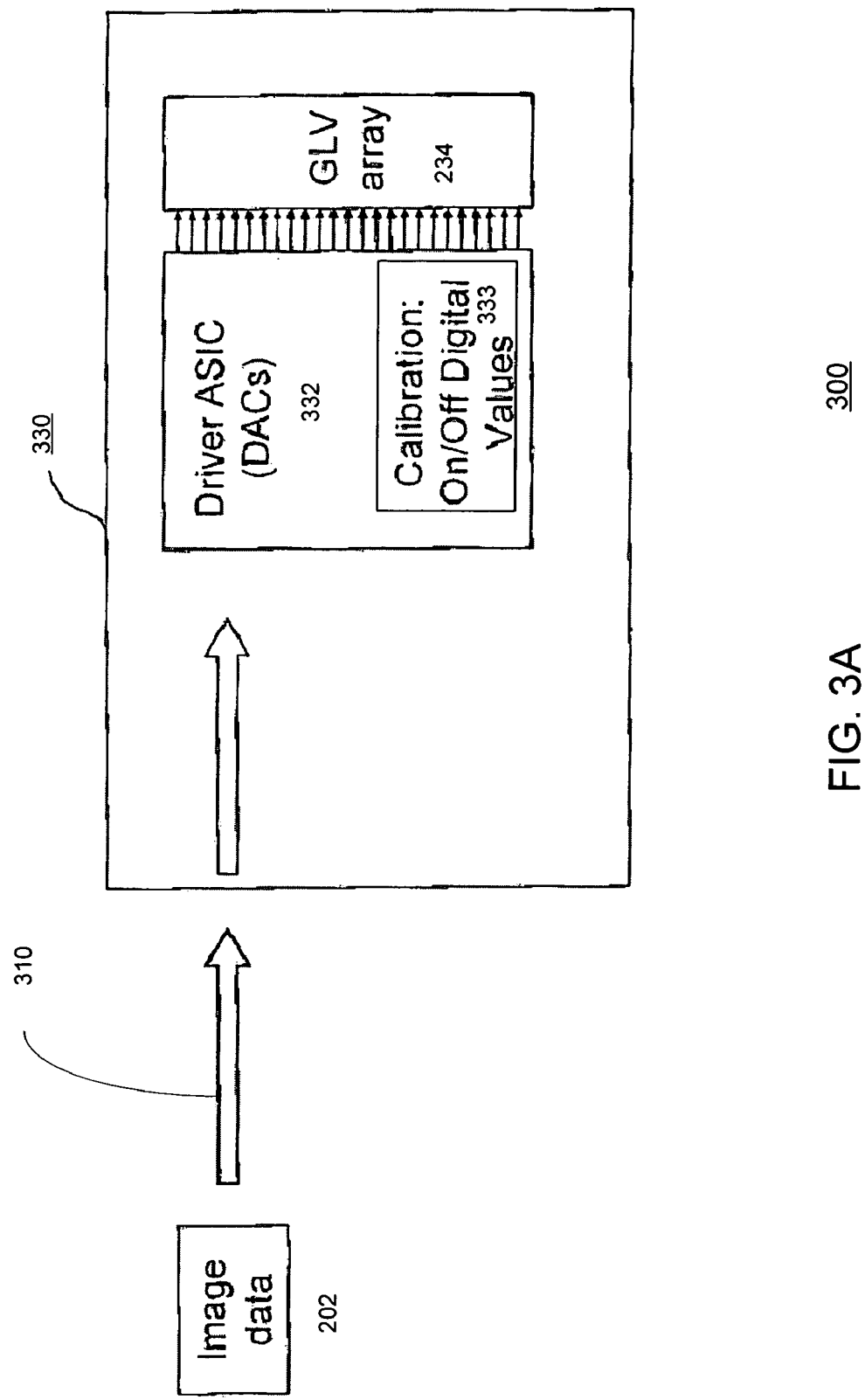
FIG. 3A schematically shows an architecture for driving an array of light modulators in accordance with an embodiment of the present invention.

FIG. 3A schematically shows an architecture 300 for driving an array of light modulators in accordance with an embodiment of the present invention. In the architecture 300 of FIG. 3A, calibration is performed in the driver ASIC 332 on the light modulator board or module 300 (instead of off-board at the data source as in the architecture 200 of FIG. 2A). Preferably, the calibration is performed after any data compression/decompression algorithms have been performed. This advantageously minimizes the amount of data inputs to be provided to module 330, and also simplifies data processing in module 330.

In accordance with one embodiment, the image data is provided 310 serially as one bit per image bit from the image data source 202 to the driver ASIC 332 of the light modulator module 330. Digital printing values 333 for each bit may be stored locally on the driver ASIC 332 in the light modulator module 330, or alternatively they may be stored on a chip external to the driver ASIC 332. Digital printing values comprise data indicating pulse-width modulation (PWM) and amplitude values for a drive signal for each light modulator device of the light modulator array 234. The digital printing values are converted to an analog drive signal, which is provided to the corresponding light modulator. As can be appreciated, the architecture 300 of FIG. 3A advantageously does not require high-speed data transfer from an image source 202 to the light modulator module 330, and allows for simpler data transfer between modules (via cables) and within a module. The architecture 300 of FIG. 3A also advantageously allows for more image data to be transferred for a given communications bandwidth.

Figure 3B:
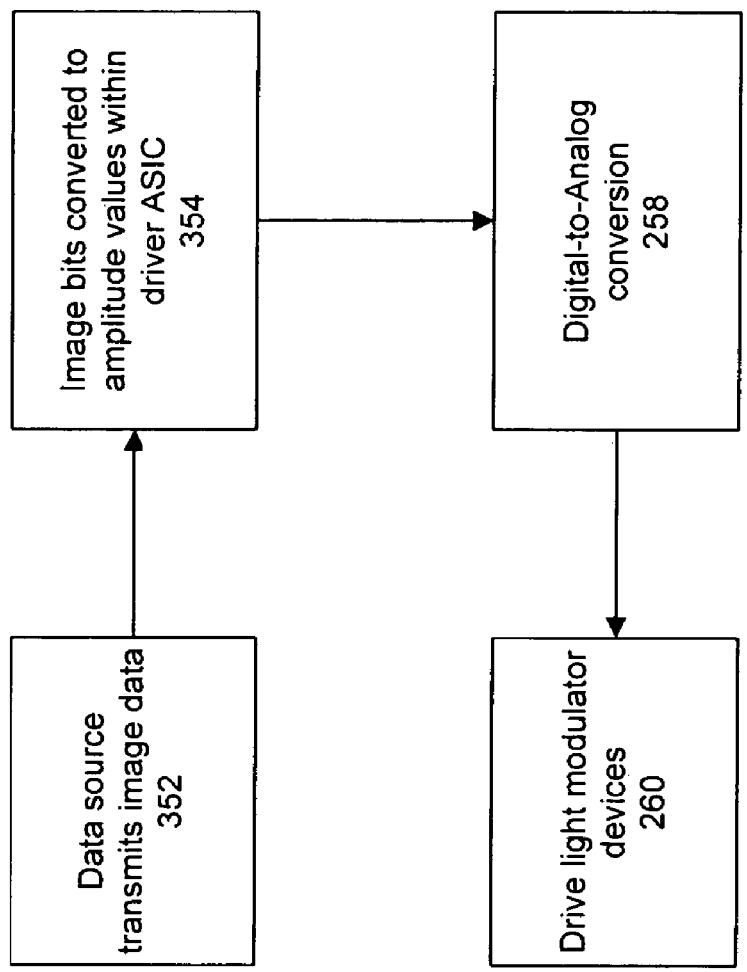
FIG. 3B is a flow chart depicting a method of driving utilizing the architecture shown in FIG. 3A in accordance with an embodiment of the present invention.

FIG. 3B is a flow chart depicting a method 350 of driving utilizing the architecture shown in FIG. 3A. In accordance with this method 350, the image data (not the amplitude data) is transmitted 352 from the image data source 202 to the light modulator board or module 330. This advantageously reduces the bandwidth required between the data source 202 and the light modulator module 330.

In the driver ASIC 332 of the light modulator module 330, the image bits are converted 354 to amplitude values. For example, 10-bit amplitude values may be used. The conversion may be performed, for example, using the circuitry described below in relation to FIG. 4.

Of course, digital to analog conversion of the amplitude values is also performed 258 in the driver ASIC 332, and the resulting analog signals are used to drive 260 the light modulator devices of the array 234.

Selecting Digital Printing Values by Driver ASIC

Figure 4:
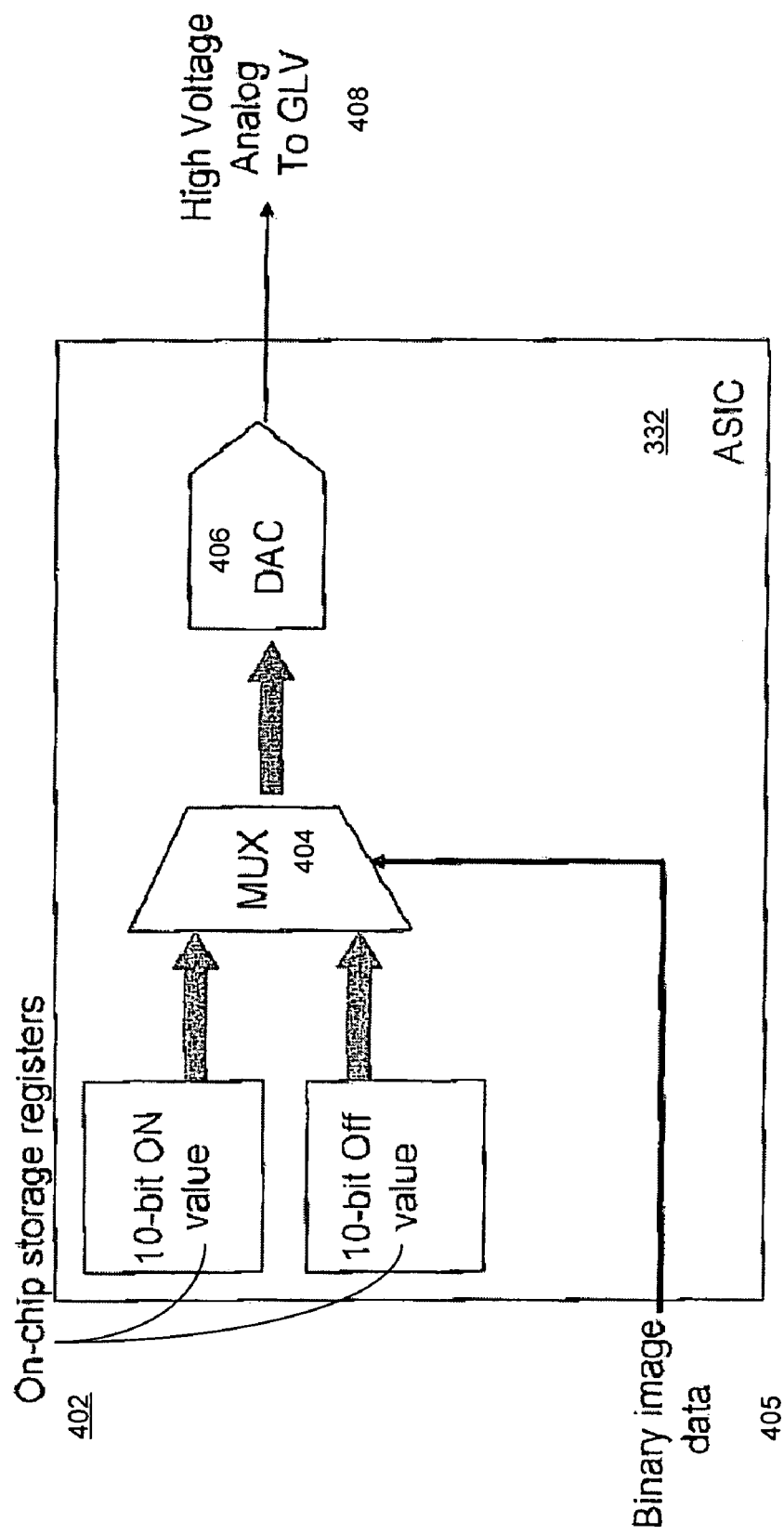
FIG. 4 schematically shows how digital printing values stored in the driver ASIC of a module may be employed, in accordance with an embodiment of the present invention.

FIG. 4 schematically shows how the digital printing values (i.e. the amplitude values) stored in a driver ASIC 332 of the light modulator module 330 may be employed using circuitry, in accordance with an embodiment of the present invention. In the example of FIG. 4, on-chip storage registers 402 store 10-bit on/off amplitude values for each channel (i.e. for each light modulator device in the array 234. A 10-bit ON digital printing value or a 10-bit OFF digital printing value is selected for output through the multiplexer 404 depending on whether the bit 405 of the image data is at a logical "1" or at a logical "0." A digital to analog converter (DAC) 406 converts the selected digital printing value to analog, which is then provided to the associated light modulator as a high voltage analog signal 408.

The driver ASIC 332 can be operated with pulse widths around say 5 µs (5 microseconds). In one embodiment, the entire calibration data are loaded into the driver ASIC 332 with each pulse time—every 5 µs. The resulting 10-bits×272 channels requires a wide, high speed data bus. These data rates become even more challenging for higher-speed operation, for example approaching 2 µs pulse widths. In another embodiment, in order to minimize the data rate and permit speed increases, the driver ASIC 332 may have the calibration data stored within the chip itself. After calibration, only single 1-bit values are required to indicate the ON/OFF state of the driver channels. This will reduce the overall data rate by about 10 times, and will permit the use of shorter pulses, and/or simpler data buses.

Pulse Width Modulation Data Values

Figure 5:
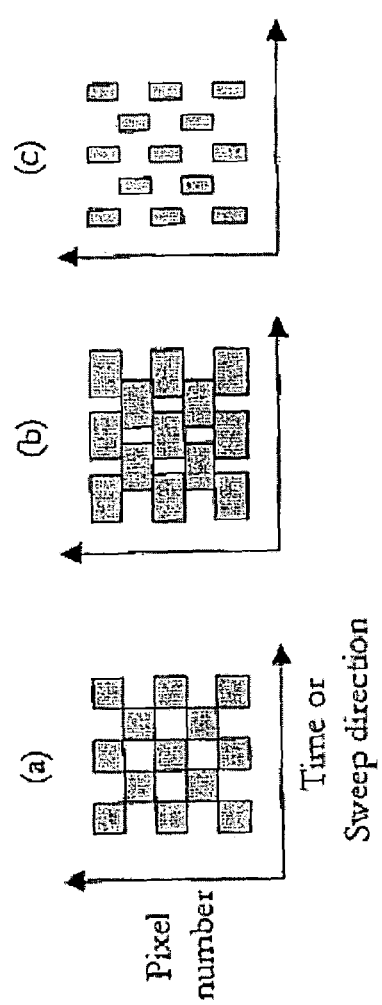
FIG. 5 show example print patterns.

For digital printing, a ribbon light modulator switches between two states ("ON" and "OFF") in order to print binary patterns like the simple checkerboard shown in FIG. 5. FIG. 5(a) shows a simple, uniform checkerboard pattern. A given pixel is turned ON for one column time, and OFF for the next. This example yields a 50% grayscale pattern over the larger area.

Figure 6:
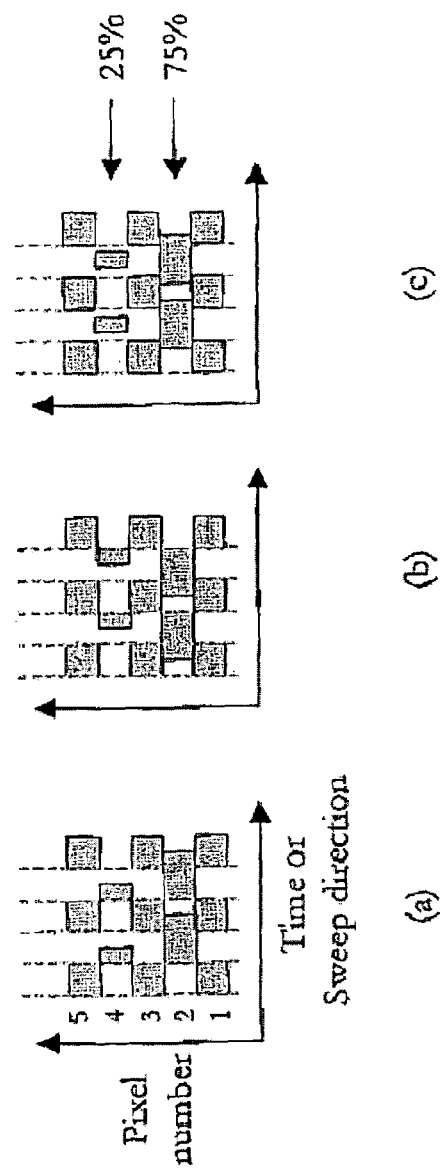
FIG. 6 schematically illustrates possible methods of implementing a PWM function.

There are application requirements to vary the effective duty cycle by varying the length of time for an "ON" state for a given pixel—this is referred to as pulse width modulation or PWM. FIGS. 5(b) and 5(c) illustrate the effect of varying the falling edge of the "ON" pulse to create 75% "ON" and 25% "ON" greyscale patterns, respectively. In the examples shown in FIG. 5, all pixels within each example have the same "ON" pulse width. In FIG. 5(b), the ON pulse is lengthened to 1.5 times that in FIG. 5(a) to produce the 75% greyscale pattern. In FIG. 5(c), the ON pulse is shortened to 0.5 times that in FIG. 5(a) to produce the 25% greyscale pattern. In practice, there may be a need to vary the pulse width of each pixel independently, due to non-uniformities created by several factors throughout the system. FIG. 6 shows a few extreme examples and is used to illustrate some of the possible methods of implementing this PWM function.

FIG. 6 shows five pixels, or channels in a ribbon light modulator array, with varying pulse widths. Pixels 1, 3, and 5 have a pulse width appropriate to 50% greyscale pattern, while pixel 2 is set to 75% greyscale, and pixel 4 is at 25% greyscale. FIG. 6 illustrates different methods of applying the varying pulse widths. In FIG. 6(a), the falling edge of the "ON" pulse is modulated. In FIG. 6(b), the rising edge of the pulse is modulated. And in FIG. 6(c), the pulses are modulated symmetrically on both the rising and falling edge of the "ON" pulse.

The applicants contemplate four potential timing schemes for pulse width modulation:
(i) varying the rising (leading) edge of the "ON" pulse;
(ii) varying the falling (trailing) edge of the "ON" pulse;
(iii) varying both edges equally, to yield a symmetric duty cycle variation; and
(iv) varying both edges, each by a different value to arbitrarily create any desired output.

In one embodiment, the driver ASIC is designed to accomplish the $4^{th}$ scheme as listed above—namely to vary both edges independently with up to 8-bits of precision. In addition to variable pulse width, this scheme will also permit variation of pixel timing with respect to adjacent pixels, while maintaining a constant pulse width.

The PWM data values may be determined during a calibration procedure, in a manner similar to that for the previously described amplitude data values. The driver ASIC may use an arbitrary (type iv) scheme for modulating both the rising and falling edges of an ON pulse, by up to 8-bits for each edge of each channel.

Applying Both Amplitude and PWM Data

By storing both amplitude and PWM calibration data on the driver ASIC itself, images are reproduced by simply sending the binary (1 or 0) pattern to the light modulator module 330 (see FIG. 3). The value of the image data will determine which amplitude value to apply (ON or OFF).

The light modulator module 330 may also be configured to store the "present" and "next" image data pixel values in order to predict a transition from ON to OFF, or OFF to ON. The "transition type" will then be used to select the PWM data value and the amplitude data value. For example, assuming three PWM data values, a PWM data value may be selected if the image data pixel transitioned from OFF to ON, a second PWM data value may be selected if the image data pixel transitioned from ON to OFF, and a third PWM data value may be selected if the image data pixel transitioned in a particular 3-bit pattern (e.g., from OFF to ON and then to ON).

Third or More Amplitude Levels

Figure 7:
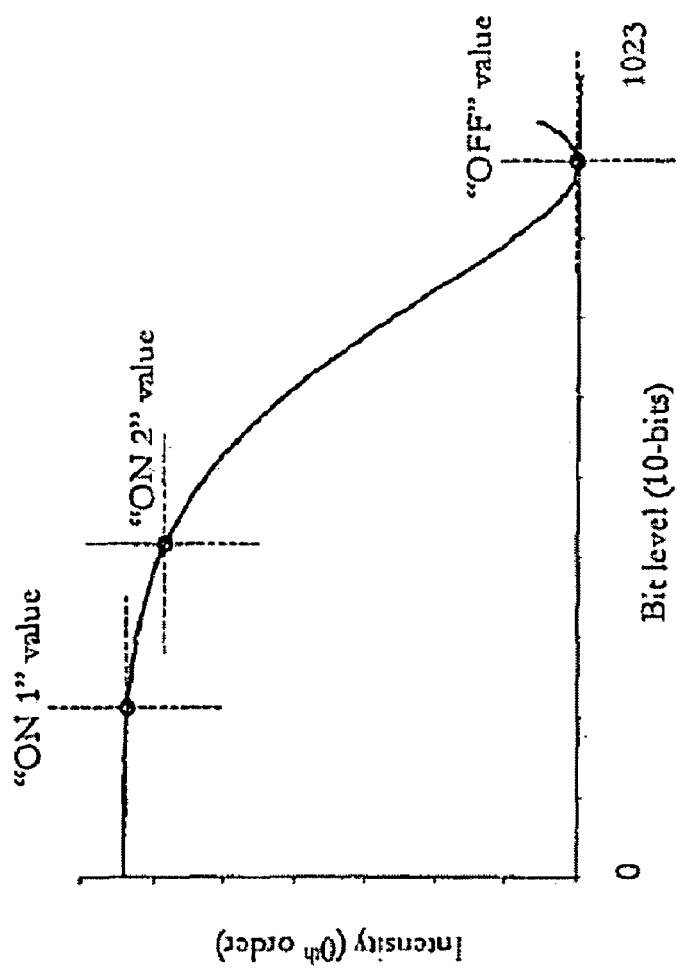
FIG. 7 schematically illustrates a possible use of a $3^{rd}$ amplitude value in accordance with an embodiment of the present invention.

In order to give maximum flexibility to the driver ASIC, it may be designed with more than two levels of both amplitude and delay values. An example of a third amplitude value is illustrated in FIG. 7, where the third amplitude value comprises a second "ON" value. Such a third amplitude level may be used in relation to timing of the rising edge of the data signal. Similarly, a fourth amplitude level may be provided and used in relation to timing of the falling edge of the data signal. Additional levels beyond four may be used to further control the signal's rising and falling edges (e.g. add more amplitude steps) or may be used to modulate the signal in a predetermined pattern in response a recognized sequence of binary image data.

Specific Implementation

Figure 8:
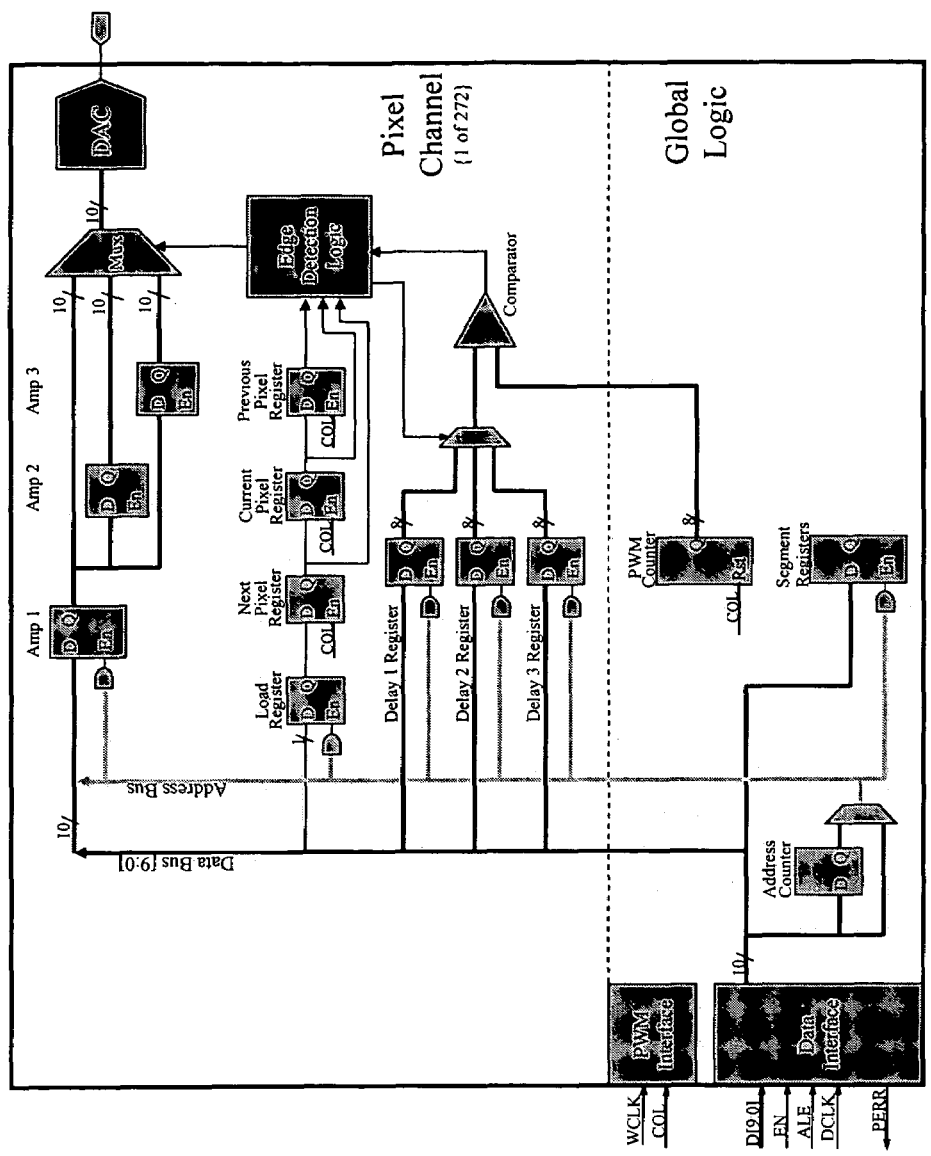
FIG. 8 shows a functional block diagram of a driver ASIC in one implementation in accordance with an embodiment of the present invention.

A functional block diagram of select circuitry in a driver ASIC in accordance with a specific implementation is shown in FIG. 8. As depicted, the circuitry includes global logic and pixel channels (one pixel channel is shown). The global logic includes a PWM interface and a data interface, and various counters and registers. Data and address buses provide for communication from the global logic to each of the pixel channels.

The specific implementation provides a PWM mode that uses an independent PWM clock. In the PWM mode, internally-stored 10-bit amplitude values (Amp1, Amp2, Amp3) are toggled with single bit image data for digital printing application. Pulse width modulation is enabled through programmable delays on data transition edges. Three programmable transition edge delays (Delay 1, Delay 2, Delay 3) are provided, each delay up to precision of 8 bits.

Other modes, including a video mode and a test mode is also provided in this specific implementation. In the video mode, the high-speed 10-bit data bus is utilized, and PWM is disabled. In the test mode, the analog outputs are multiplexed to a test pin.

Figure 9:
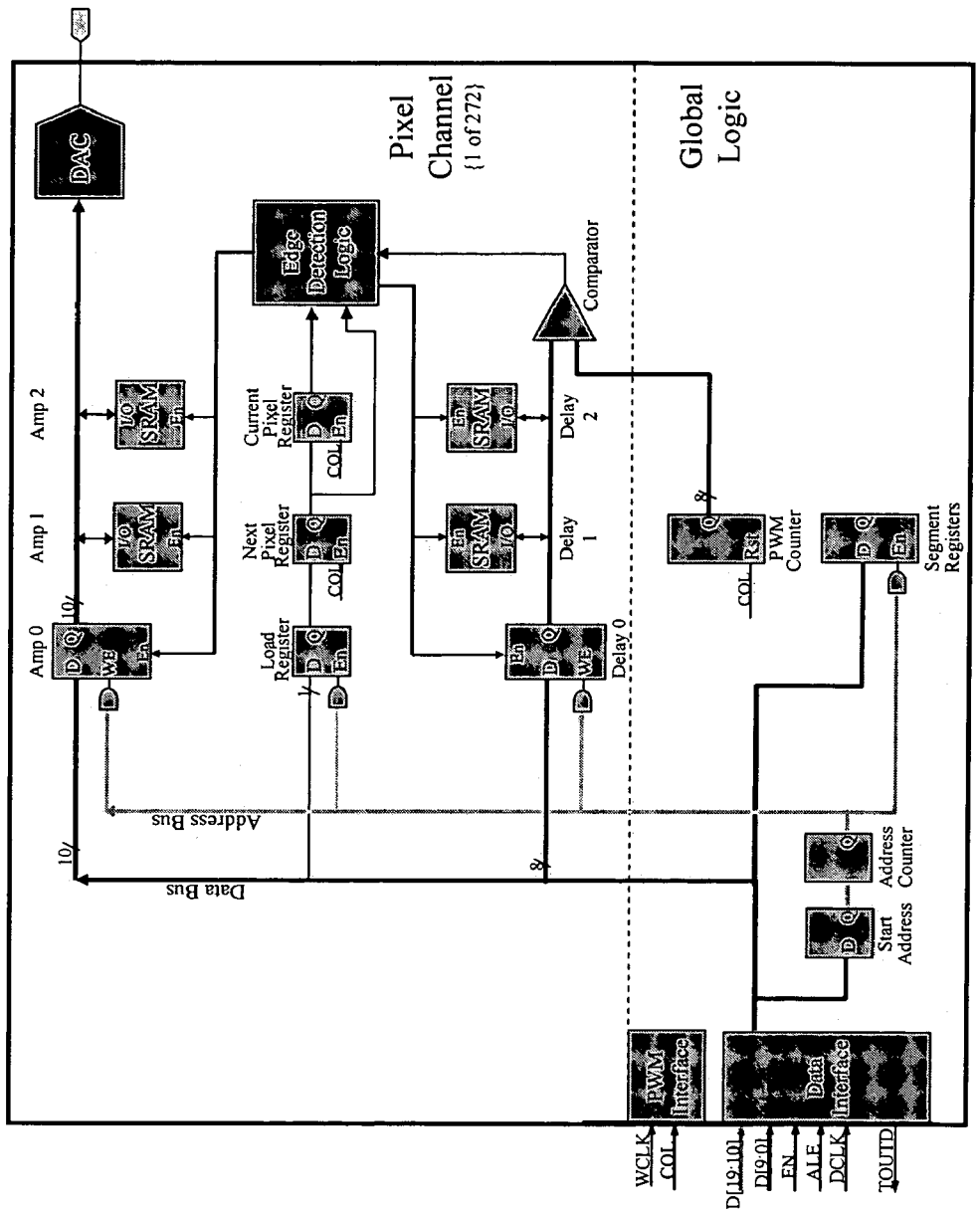
FIG. 9 shows a functional block diagram of a driver ASIC in another implementation in accordance with an embodiment of the present invention.

Another implementation of circuitry in a driver ASIC is shown in FIG. 9. This implementation is similar to, but somewhat modified in comparison to, the circuitry of FIG. 8.

While the above discussion is in the context of light modulator modules, an alternate embodiment applies the circuitry discussed to direct light emitter modules. In such a direct light emitter module, the light modulator array would be replaced with a direct light emitter array. In other words, embodiments of the invention relate more generally to an illuminator module, where the illuminator module may be a light modulator module or a direct light emitter module.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of providing drive signals to an illuminator module having a plurality of channels in a printing application, the method comprising:
   providing binary image data comprising image bits from a data source to the illuminator module, wherein both a present image bit and a next image bit for a pixel are stored and used to predict a transition type for use in selecting a pulse width modulation value; and
   converting each image bit to a multi-bit amplitude value within the illuminator module, wherein the conversion of each image bit to the multi-bit amplitude value depends at least on a value of the image bit and which channel is associated with the image bit, the conversion of each image bit to the multi-bit value is performed by using the image bit to control a multiplexer circuit so as to select either a predetermined multi-bit ON value or a predetermined multi-bit OFF value, and the predetermined multi-bit ON and OFF values vary from channel to channel based on a previous calibration of the channels.

2. The method of claim 1, wherein the binary image data is provided to a driver integrated circuit in the illuminator module, and the conversion of each image bit to the multi-bit amplitude value is performed in the driver integrated circuit.

3. The method of claim 1, further comprising:
   applying pulse width modulation to the drive signals.

4. The method of claim 3, wherein pulse width modulation is applied using programmable transition edge delays.

5. The method of claim 4, wherein both rising and falling edges are programmable.

6. The method of claim 1 wherein the printing application includes paper printing.

7. The method of claim 1 wherein the printing application includes lithography.

8. The method of claim 1 wherein the printing application includes plates for a computer-to-plate application.

9. The method of claim 1, wherein drive signals generated by the illuminator module drive a light modulator array.

10. The method of claim 1, wherein drive signals generated by the illuminator module drive a direct light emitter array.

11. An apparatus for driving an illuminator array having a plurality of channels in a printing application, the apparatus comprising:
    a driver integrated circuit configured to receive binary image data;
    storage for both a present image bit and a next image bit for a channel;
    logic configured to select a delay for pulse width modulation based on the present and next image bits;
    storage for two multi-bit amplitude values per channel within the driver integrated circuit; and
    conversion circuitry for each channel including a multiplexer configured to select one of the two multi-bit amplitude values depending on a value of an image bit from the binary image data,
    wherein the two multi-bit amplitude values vary from channel to channel based on a previous calibration of the channels.

12. The apparatus of claim 11, wherein the driver integrated circuit is configured to provide a pulse width modulation (PWM) mode that applies pulse width modulation to the drive signals and that uses an independent PWM clock.

13. The apparatus of claim 12, wherein, in the PWM mode, pulse width modulation is enabled through programmable delays on data transition edges.

14. The apparatus of claim 13, wherein both rising and falling edges are programmable.

15. The apparatus of claim 12, wherein the driver integrated circuit is further configured with a video mode in which the pulse width modulation is disabled.

16. The apparatus of claim 11, wherein the driver integrated circuit is configured with global logic circuitry and pixel channel circuitry for each channel of the illuminator array, and wherein data and address buses provide communication from the global logic circuitry to the pixel channel circuitry for each channel.

17. The apparatus of claim 11, wherein the printing application is an application from a group consisting of paper printing, lithography, and computer-to-plate applications.

18. The apparatus of claim 11, wherein the illuminator module comprises a light modulator module.

19. The apparatus of claim 11, wherein the illuminator module comprises a direct light emitter module.

20. A printing apparatus wherein drive signals are provided to an illuminator module having a plurality of channels, the printing apparatus comprising:
    means for providing binary image data comprising image bits from a data source to the illuminator module, wherein both a present image bit and a next image bit for a pixel are stored and used to predict a transition type for use in selecting a pulse width modulation value; and
    means for converting each image bit to a multi-bit amplitude value within the illuminator module, wherein the conversion of each image bit to the multi-bit amplitude value depends at least on a value of the image bit and which channel is associated with the image bit, and wherein the conversion of each image bit to the multi-bit amplitude value is performed by using the image bit to control a multiplexer circuit so as to select either a predetermined multi-bit ON value or a predetermined multi-bit OFF value, wherein the predetermined multi-bit ON and OFF values vary from channel to channel based on a previous calibration of the channels.

* * * * *